United States Patent
Araujo et al.

(10) Patent No.: US 10,155,298 B2
(45) Date of Patent: Dec. 18, 2018

(54) ALPHA CASE REMOVAL PROCESS FOR A MAIN ROTOR BLADE SPAR

(75) Inventors: Robert J. Araujo, Shelton, CT (US); Tapas K. Mukherji, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1281 days.

(21) Appl. No.: 13/332,440

(22) Filed: Dec. 21, 2011

(65) Prior Publication Data

US 2013/0165024 A1 Jun. 27, 2013

(51) Int. Cl.
| B24C 1/08 | (2006.01) |
| B24C 3/00 | (2006.01) |
| B64F 5/40 | (2017.01) |
| B64C 27/473 | (2006.01) |
| B64F 5/30 | (2017.01) |

(52) U.S. Cl.
CPC ............... *B24C 1/086* (2013.01); *B24C 1/08* (2013.01); *B24C 3/00* (2013.01); *B64F 5/40* (2017.01); *B64C 2027/4736* (2013.01); *B64F 5/30* (2017.01); *Y02P 70/585* (2015.11); *Y10T 29/49318* (2015.01)

(58) Field of Classification Search
CPC ......... B24C 1/086; B24C 3/00; B64F 5/0081; B23P 15/02; B23P 15/04
USPC ................................................. 451/2, 38, 75
See application file for complete search history.

(56) References Cited

U.S. PATENT DOCUMENTS

| 5,441,574 | A | 8/1995 | Hansen et al. | |
| 6,177,206 | B1* | 1/2001 | Sullivan et al. | 428/687 |
| 8,439,724 | B2* | 5/2013 | El-Wardany et al. | 451/38 |
| 8,622,784 | B2* | 1/2014 | Miller et al. | 451/29 |
| 8,732,949 | B2* | 5/2014 | Berlanger et al. | 29/889.7 |
| 2004/0097171 | A1* | 5/2004 | Liwszyc et al. | 451/36 |
| 2007/0050977 | A1* | 3/2007 | Werner | 29/889.7 |
| 2009/0325468 | A1* | 12/2009 | El-Wardany et al. | 451/38 |
| 2010/0003894 | A1* | 1/2010 | Miller et al. | 451/5 |
| 2010/0081364 | A1* | 4/2010 | Antolotti et al. | 451/39 |
| 2010/0162565 | A1 | 7/2010 | Mukherji | |
| 2010/0210186 | A1* | 8/2010 | Panuska et al. | 451/38 |
| 2011/0016716 | A1* | 1/2011 | Berlanger et al. | 29/889.23 |
| 2011/0041334 | A1* | 2/2011 | Berlanger et al. | 29/889.23 |
| 2011/0081834 | A1* | 4/2011 | Roth | 451/38 |
| 2011/0081842 | A1* | 4/2011 | Siepi et al. | 451/99 |
| 2012/0136630 | A1* | 5/2012 | Murphy et al. | 702/188 |
| 2013/0043009 | A1* | 2/2013 | Bunker et al. | 165/104.34 |

OTHER PUBLICATIONS

European Search Report for European Patent Application No. 12197784.7 dated Aug. 6, 2014.

\* cited by examiner

*Primary Examiner* — Eileen Morgan
(74) *Attorney, Agent, or Firm* — Cantor Colburn LLP

(57) ABSTRACT

A method of removing an alpha case from a rotor blade by directing a water jet to mill a surface of a rotor blade spar to remove an Alpha-case therefrom.

17 Claims, 6 Drawing Sheets

ALPHA CASE REMOVAL PROCESS FOR A MAIN ROTOR BLADE SPAR

BACKGROUND

The present application relates to a rotary wing aircraft main rotor blade spar.

Conventional rotary wing aircraft rotor blades include a spar that functions as the primary structural member of the rotor blade to react torsional, bending, shear, and centrifugal loads. A leading edge and trailing edge assembly envelop the spar to yield a desired airfoil contour. The spar typically extends along the length of the rotor blade and mounts at an inboard end to a cuff assembly that mounts to a rotor hub.

The spar is often manufactured of a high strength metallic material such as a titanium alloy. The spar is a relatively expensive component that is often retrieved from a damaged or worn main rotor blade such that a remanufactured main rotor blade may thereby be assembled with the refurbished spar.

Spar retrieval is conventionally accomplished through heat decomposition and manual chiseling and scraping of main rotor blade components therefrom. Remnants of the main rotor blade components, oxidized coatings, adhesives and primer are conventionally stripped from the spar by a heated caustic solution. Moreover, the spar may have one or more areas that are below a minimum specified thickness such that the particular areas are built up with a metallic deposit. The spar is then heat treated to relieve residual stresses. The result is an alpha-embrittled zone of oxygen-enriched alpha phase that is generally termed an "Alpha-case". The Alpha-case may be deleterious to the subsequent use of the spar because of the resultant reduced ductility and fatigue resistance as compared with the underlying alpha-beta or other microstructure.

The current practice of Alpha-case removal involves hydrofluoric acid etch and hand grinding which are relatively labor intensive and may generate undesirable fumes.

SUMMARY

A method of removing an alpha case from a rotor blade according to an exemplary aspect of the present application includes directing a water jet to mill a surface of a rotor blade spar to remove an Alpha-case therefrom.

A system to mill a rotor blade spar according to an exemplary aspect of the present application includes a fixture to receive a rotor blade spar. A water jet system to index upon the rotor blade spar, the water jet system includes a nozzle which defines nozzle diameter of between 0.014-0.016 inches (0.36-0.41 mm) A control system to direct said water jet to mill a surface of a rotor blade spar to remove an Alpha-case therefrom.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
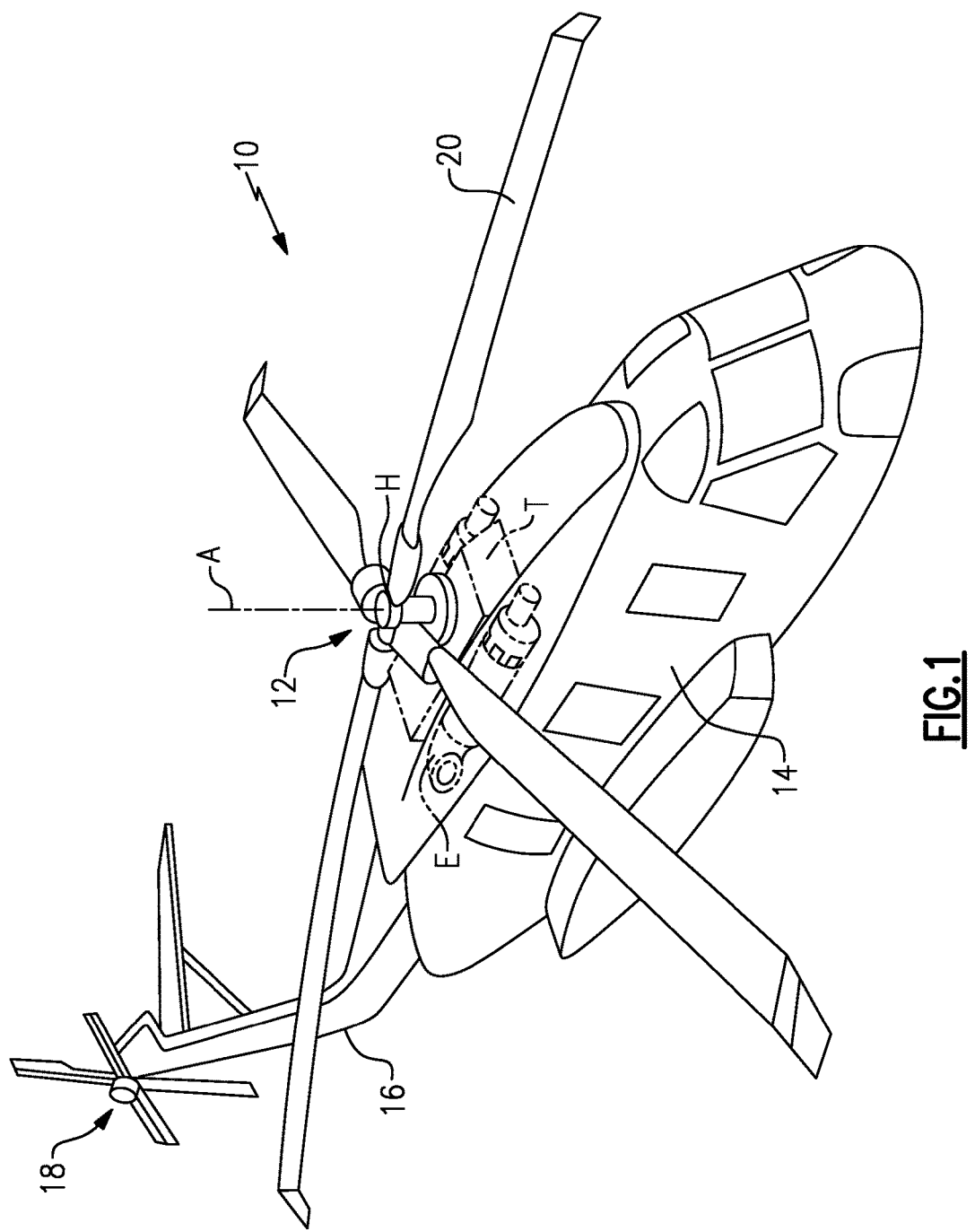
FIG. 1 is a schematic perspective view of a rotary wing aircraft according to one non-limiting embodiment of the present application.

FIG. 1 schematically illustrates a rotary-wing aircraft 10 having a main rotor system 12. The aircraft 10 includes an airframe 14 having an extending tail 16 which mounts an anti-torque system such as a tail rotor system 18. The main rotor system 12 is driven about an axis of rotation A through a main gearbox (illustrated schematically at T) by one or more engines E. The main rotor system 12 includes a multiple of rotor blade assemblies 20 mounted to a rotor hub H. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
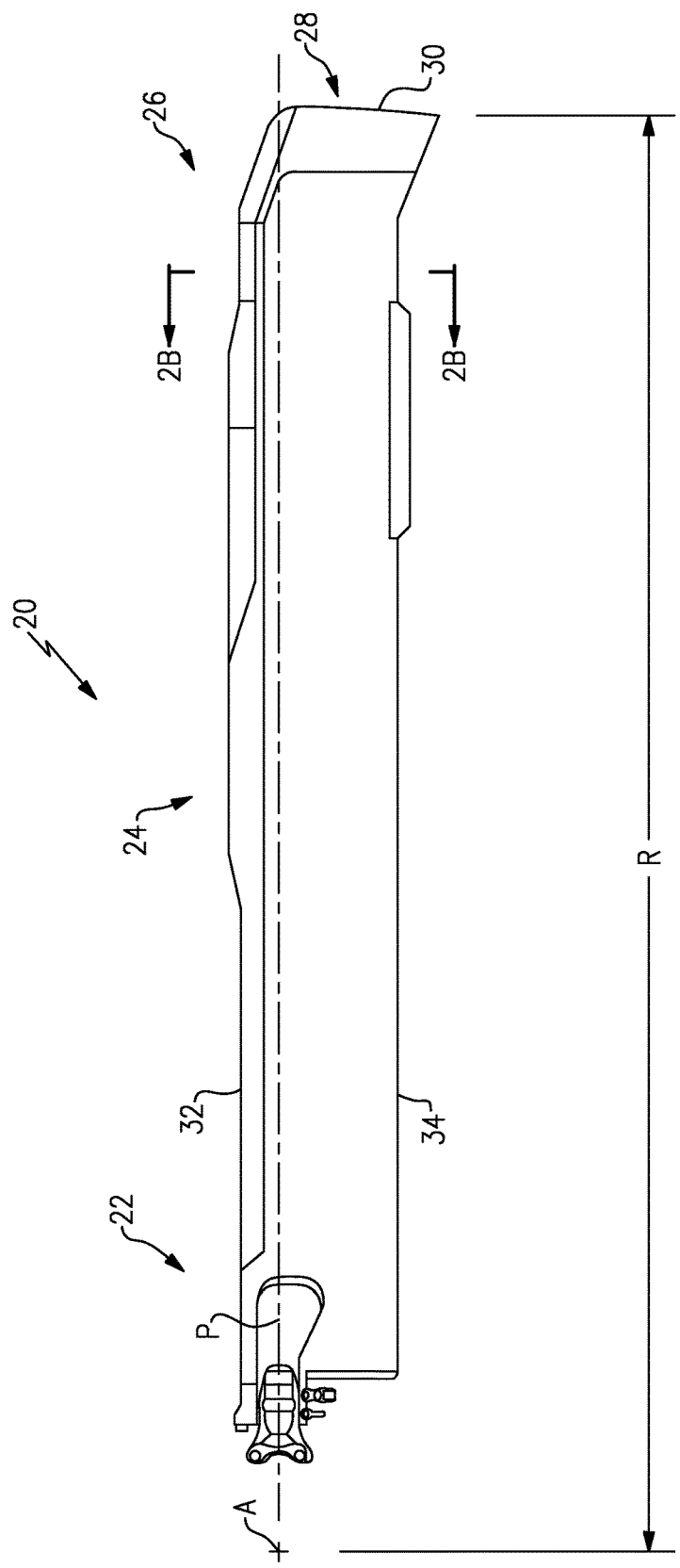
FIG. 2A is a perspective view of a main rotor blade.

Referring to FIG. 2A, each rotor blade assembly 20 (only one illustrated) of the main rotor system 12 includes a root section 22, an intermediate section 24, a tip section 26 and a tip cap 28. Each rotor blade section 22, 24, 26, 28 may define particular airfoil geometries to particularly tailor the rotor blade aerodynamics to the velocity increase along the rotor blade span. The rotor blade tip section 26 may include angled and non-angled forms such as anhedral, cathedral, gull, bent, and others. The rotor blade sections 22-28 define a span of the main rotor blade assembly 20 between the axis of rotation A and a distal end 30 of the tip cap 28 along a longitudinal feathering axis P between a leading edge 32 and a trailing edge 34. It should be understood that although a main rotor blade assembly 20 is illustrated in the non-limiting embodiments disclosed herein, other blade assemblies may also benefit herefrom.

Figure 2B:
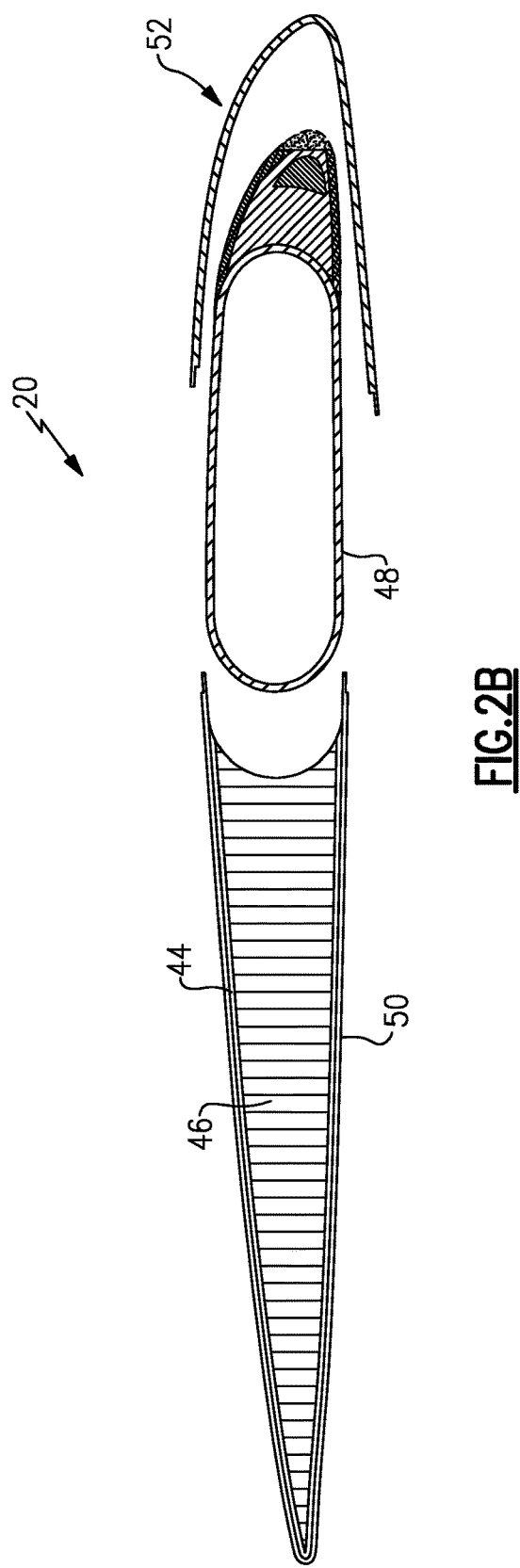
FIG. 2B is an exploded view of the main rotor blade of FIG. 2A.
Figure 2C:
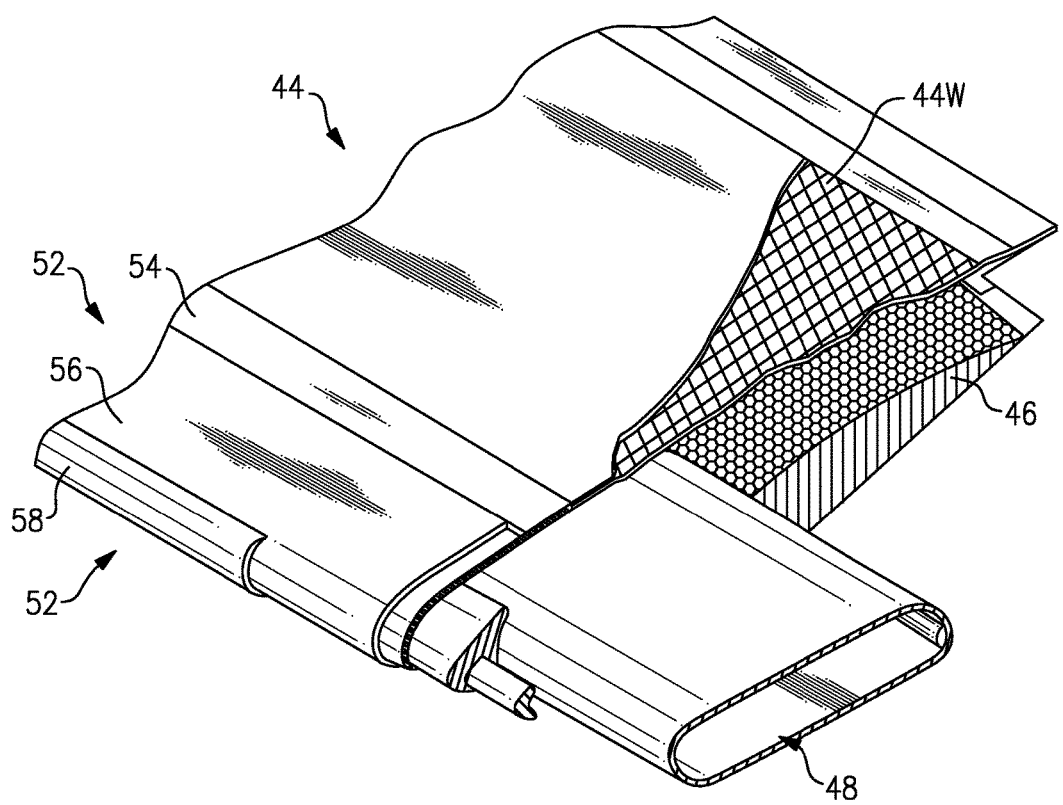
FIG. 2C is a perspective partially exploded view illustrating the components of the rotor blade of FIG. 2A.

Referring to FIG. 2B, the rotor blade assembly 20 generally includes an upper skin 44, a core 46, a main spar 48, a lower skin 50, and a leading edge assembly 52. The core 46 may include a lightweight foam material, honeycomb material or combinations thereof. The skins 44, 50 may be formed from several plies of prepreg composite material such as woven fiberglass material embedded in a suitable resin matrix. Wire mesh screen 44W, 50W (FIG. 2C; only 44W shown) may be embedded into at least one ply of the respective skins 44, 50 to provide an electrical path to the rotor hub H (FIG. 1). The main spar 48, core 46 and skins 44, 50 are generally referred to as a pocket assembly, the forward portion of which is closed out by the leading edge assembly 52. The spar 48 of the described non-limiting embodiment is formed from a titanium-alloy; however, in alternative embodiments, the spar 48 may be formed from other metals, composite materials, or combinations thereof. It should be understood that the spar 48, core 46, skins 44, 50, and leading edge assembly 52 may be separated into a multiple of segments which may include various combinations of span-wise lengths.

Once stripped of all remnants, the main rotor blade spar 48 is ready for refurbishment. For further understanding of aspects associated with stripping of the spar 48, attention is directed to U.S. patent application Ser. No. 12/345813, entitled REFURBISHING METHOD AND SYSTEM FOR A MAIN ROTOR BLADE SPAR which is assigned to the assignee of the instant disclosure and which is hereby incorporated herein in its entirety.

Preparation of a titanium-alloy workpiece such as refurbishment of the main rotor blade spar 48 for manufacture or remanufacture may require surface cleaning, Alpha-case removal, section thickness reduction or various combinations thereof.

Figure 3:
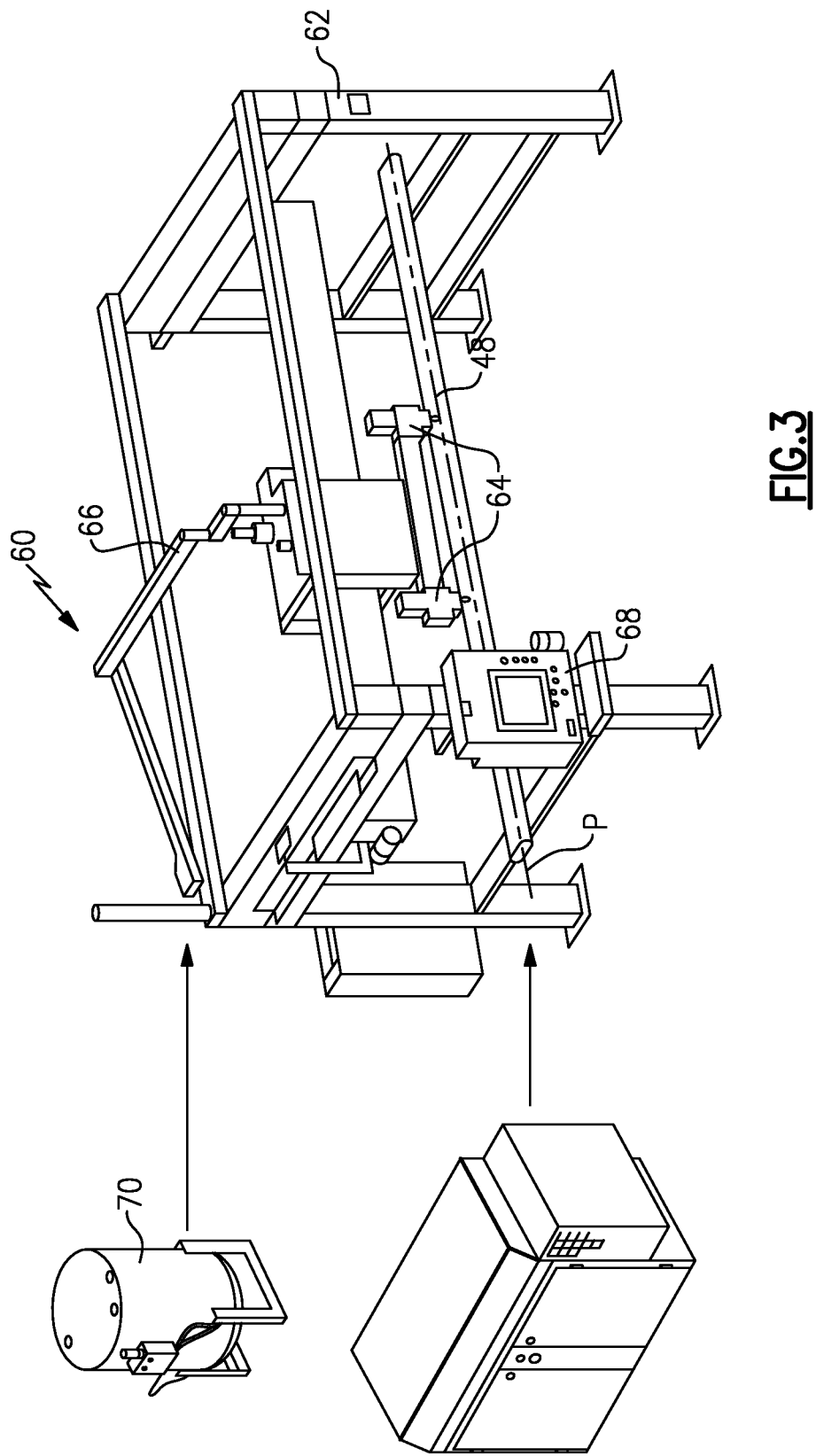
FIG. 3 is a schematic view of a water jet system.

Referring to FIG. 3, a high-velocity water jet system 60 such as that manufactured by Ormond, LLC of Auburn, Wash. USA, or WardJet of Tallmadge, Ohio USA is herein utilized to mill the titanium-alloy workpiece such as the spar 48 to provide for surface cleaning, Alpha Case removal, section thickness reduction or various combinations thereof.

A fixture 62 operates to position the titanium-alloy workpiece, for example, relative the spar longitudinal axis P such that a nozzle 64 is positioned by a robotic arm 66 to direct a water jet or water jet with abrasive onto the titanium workpiece in response to a controller 68. It should be understood that various adjustable fixtures, stationary fixtures, robotic arms and combinations thereof may be provided to position the titanium-alloy workpiece and nozzle 64. Control process automation may be readily accomplished due in part to the process robustness disclosed herein which accommodates a variation in working distance of approximately 1.0" and a nozzle angle from 45 to 90 degrees.

The nozzle 64, in one non-limiting embodiment provides a relatively large nozzle diameter of between 0.014-0.016 inches (0.36-0.41 mm) which operates at a pressure of 10-50 KSI. Such a relatively large diameter provides advantages in the milling of a titanium-alloy workpiece with a water jet and an abrasive jet. It should be understood that a multiple of nozzles 64 mounted to robotic arm 66 may be utilized to increase the process speed.

The nozzle 64 at a pressure of 10-50 KSI may be utilized to generate a pure water jet without abrasives to prepare a surface of the titanium-alloy. The nozzle 64 may be utilized to generate a pure water jet which provides such surface preparation at a speed of 120 sq.inches/minute. Such surface preparation may be utilized to, for example, clean a Turco coat and remove remnants from the titanium-alloy workpiece surface.

The nozzle 64 at a pressure of 10-50 KSI also provides a relatively large volume flow water jet for use with an abrasive additive from an abrasive supply 70 to generate an abrasive jet which, for example, readily removes an Alpha-case layer removes scratches, reduces a section thickness of the titanium-alloy workpiece and combinations thereof. It should be understood that depth of material removal and surface finish may be controlled by the abrasive grit size, the water jet pressure, the nozzle size, the rate of travel, dwell time and combinations thereof.

The nozzle 64 may be utilized to generate the abrasive jet to, for example, remove the Alpha-case from the titanium-alloy workpiece surface at a speed of approximately 120 sq.inches/minute. The removal rate is also a function of abrasive type such as, Garnet, Silicon Carbide, Aluminum Oxide and others. Different garnet sources have different garnet break down characteristics and Applicant has determined that the HPX-variety High Performance Crystalline Waterjet Abrasive may be preferred.

Figure 4:
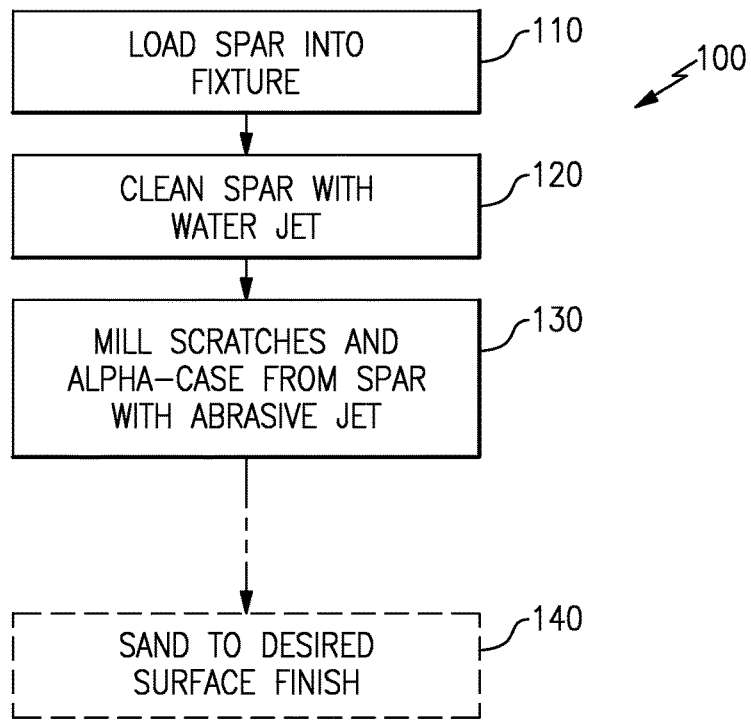
FIG. 4 is a process to mill a titanium-alloy workpiece according to one non-limiting aspect of the present application.

With reference to FIG. 4, and in accords to a process 100 disclosed herein, the spar 48 is mounted within the fixture (step 110). The pressure of the water jet is controlled to avoid damage to the spar 48 yet clean the surface of the spar to remove a Turco coating or other material remnants without the hot caustic chemicals heretofor required (Step 120). Then, in a subsequent step (Step 130), abrasives are introduced to the water jet to provide an abrasive jet to mill the scratches and alpha-case from the surface of the spar 48 which replaces the heretofor time consuming hand grinding process (Step 130). An optional, subsequent sanding process step may then follow to achieve a desired surface finish requirement (Step 140). It should be understood that various automated sanding, buffing or other such process steps may alternatively or additionally be utilized to achieve a final desired surface finish.

Figure 5:
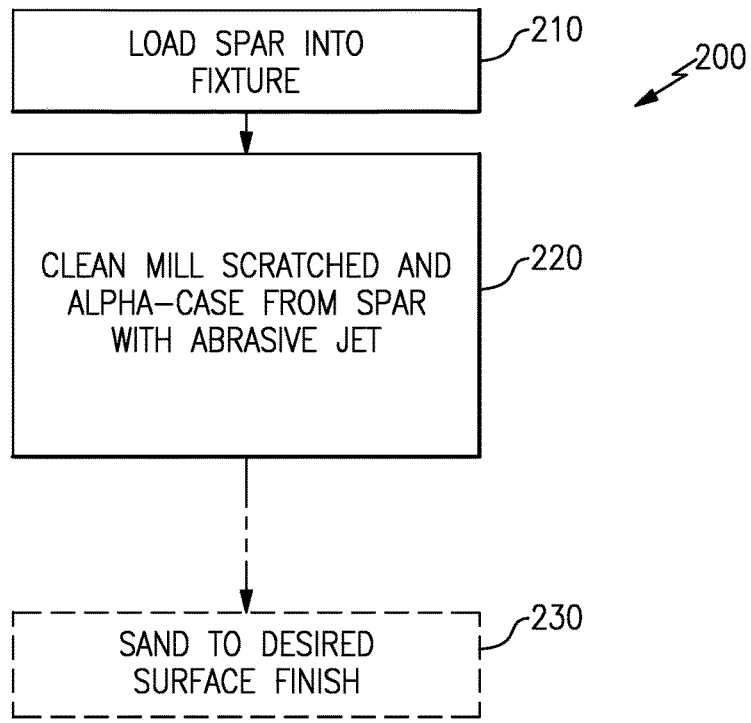
FIG. 5 is a process to mill a titanium-alloy workpiece according to another non-limiting aspect of the present application.

With reference to FIG. 5, and in accords to a process 200 according to another non-limiting embodiment disclosed herein, the water jet and abrasive jet processes are combined into a single step operation (Step 220) after the spar 48 is mounted within the fixture (step 210). With the abrasive jet alone, the Turco coat scratches and the Alpha-case are milled away in one step. An optional subsequent sanding process step may then follow to achieve a desired surface finish requirement (Step 230). It should be understood that various automated sanding, buffing or other such process steps may alternatively or additionally be utilized to achieve a final desired surface finish.

In one example process, Applicant has determined that scratches within the spar 48 are readily removed at a removal speed of 75 sq.inches/minute with 80 mesh garnet at 4 lbs/of garnet per minute with a sanding step performed subsequent to the abrasive jet step to achieve a desired final surface finish. The surface finish with 80 mesh garnet at a removal speed of 75 sq.inches/minute with 4 lbs/min of garnet resulted in a surface having a peak to valley depth of approximately 0.0015" such that the subsequent sanding step was effective to remove the peaks and thereby provide a the surface finish below 63 RA.

In another example abrasive jet step, 4 lb/min garnet #120 at 40 sq.in./minute provided a surface effect 0.002 deep with a finish of 135 RA.

In another example abrasive jet step, 4 lb/min garnet #120 at 80 sq.in./minute provided a surface effect 0.001 deep with a finish 155 RA. An automated sanding step subsequent to the abrasive jet resulted in a surface finish of 62 RA.

In another example abrasive jet step, garnet #80 provided a surface effect 0.0005 deep with a finish of 225 RA. An automated sanding step subsequent to the abrasive jet resulted in a surface finish of 52 RAa In another example abrasive jet step, 4 lb/min 220 Silicon Carbide at 28 sq.in./minute provided a surface effect 0.001 deep with a surface finish of 38 RA.

In another example abrasive jet step, 4 lb/min 220 Aluminum Oxide at 56 sq.in./minute provided a surface effect 0.001 deep with a surface finish of 50 RA.

The water jet and abrasive jet mill processes do not generate toxic fumes and avoids hazardous waste. No waste disposal cost is involved as the process is essentially completely green. Economic evaluation of the process demonstrated that once implemented, this process will provide significant monetary savings through energy costs alone. Large volumes of abrasive may also be recycled with conventional equipment in which 50-70% of the abrasive may be reused after first use. Furthermore, the process is readily automatized to eliminate repeated manual labor.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of removing an alpha case from a rotor blade comprising:
    mixing an abrasive with a water jet to generate an abrasive jet; and
    directing the abrasive jet at a surface of a rotor blade spar to remove Alpha-case oxidation therefrom.

2. The method as recited in claim 1, further comprising mixing garnet as said abrasive at 4 lbs/of garnet per minute.

3. The method as recited in claim 2, further comprising directing the abrasive jet at a pressure of 10-50 KSI and a travel speed of 40-80 sq.in./minute.

4. The method as recited in claim 3, further comprising directing the water jet at a skimming angle between 45 and 90 degrees.

5. The method as recited in claim 1, further comprising performing a sanding process subsequent tot said water jet to achieve a desired surface finish requirement.

6. The method as recited in claim 1, further comprising mixing garnet #120 as an abrasive at 4 lbs/of garnet per minute at 40 sq.in./minute to provide a surface effect 0.002 deep with a finish of 135 RA.

7. The method as recited in claim 1, further comprising mixing garnet #120 as an abrasive at 4 lbs/of garnet per minute at 80 sq.in./minute to provide a surface effect 0.001 deep with a finish of 155 RA.

8. The method as recited in claim 1, further comprising mixing 220 Silicon Carbide as an abrasive at 4 lbs/ per minute at 28 sq.in./minute to provide a surface effect 0.001 deep with a finish of 38 RA.

9. The method as recited in claim 1, further comprising mixing 220 Aluminum Oxide as an abrasive at 4 lbs/ per minute at 56 sq.in./minute to provide a surface effect 0.001 deep with a finish of 50 RA.

10. The method as recited in claim 1, wherein the rotor blade spar is part of a rotor blade for a rotary wing aircraft.

11. The method as recited in claim 1, wherein the Alpha-case includes an alpha-embrittled zone of oxygen-enriched alpha phase on said surface of said rotor blade spar.

12. The method as recited in claim 11, wherein said rotor blade spar is titanium and said Alpha-case is formed on said surface of the titanium.

13. A system to mill a rotor blade spar comprising:
    a fixture to receive a rotor blade spar;
    a water jet system to index upon said rotor blade spar, said water jet system includes a nozzle which defines nozzle diameter of between 0.014-0.016 inches (0.36-0.41 mm) and an abrasive mixed with the water jet to generate an abrasive jet; and
    a control system to direct said abrasive water jet at a surface of a rotor blade spar to remove Alpha-case oxidation therefrom.

14. The system as recited in claim 13, wherein the rotor blade spar is part of a rotor blade for a rotary wing aircraft.

15. The system as recited in claim 13, wherein the Alpha-case includes an alpha-embrittled zone of oxygen-enriched alpha phase on said surface of said rotor blade spar.

16. The system as recited in claim 13, wherein said rotor blade spar is titanium and said Alpha-case is formed on said surface of the titanium.

17. The system as recited in claim 13, wherein said control system includes a controller configured to direct said abrasive water jet.

* * * * *